WALTER P. GLANCY
INVENTOR.

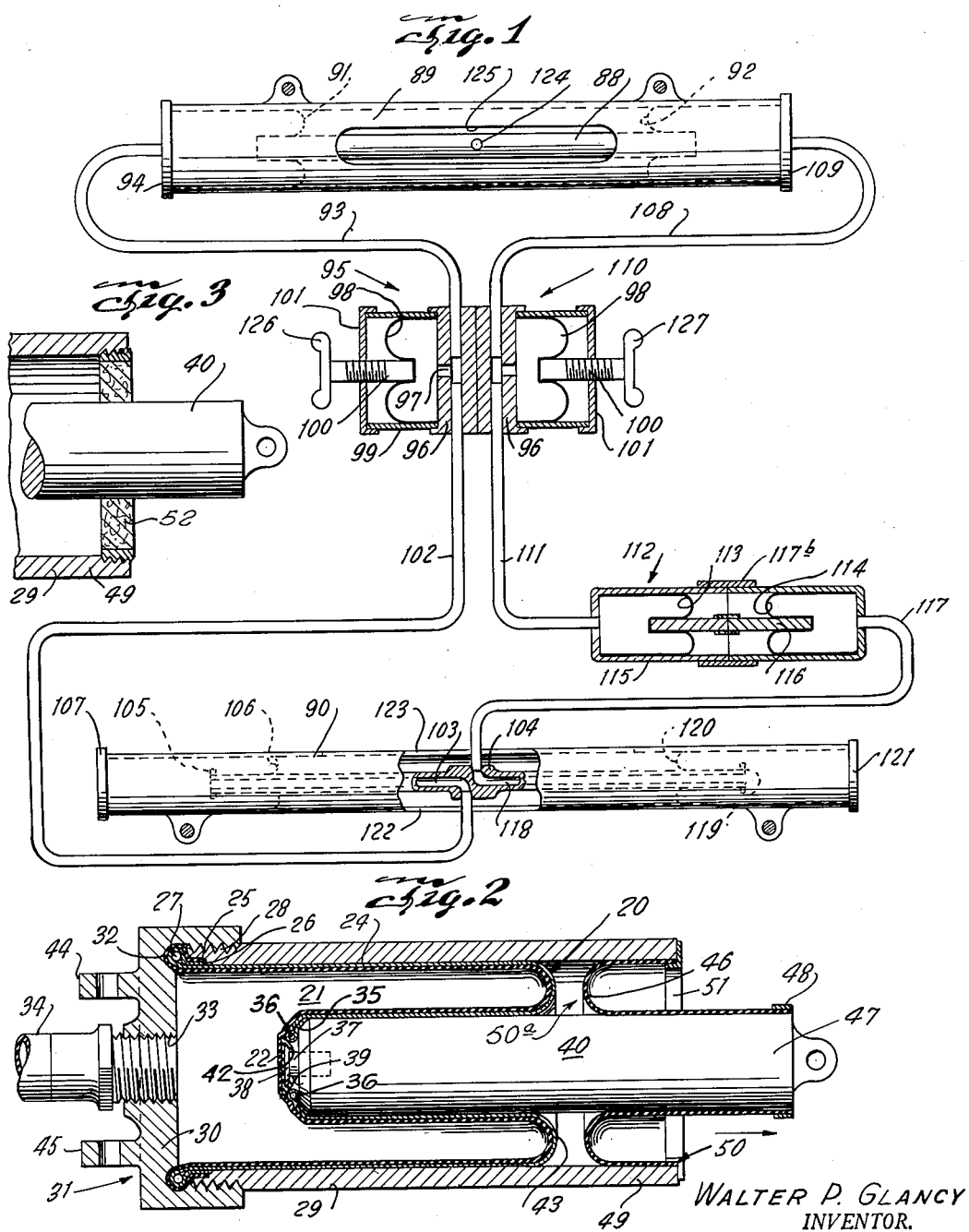
Nov. 29, 1955 — W. P. GLANCY — 2,725,078
FLEXIBLE LINER ASSEMBLY FOR A FLUID PRESSURE DEVICE
Filed June 27, 1951 — 4 Sheets-Sheet 1
WALTER P. GLANCY
INVENTOR.
ATTORNEY Nov. 29, 1955   W. P. GLANCY   2,725,078
FLEXIBLE LINER ASSEMBLY FOR A FLUID PRESSURE DEVICE
Filed June 27, 1951   4 Sheets-Sheet 2

ATTORNEY

Nov. 29, 1955 W. P. GLANCY 2,725,078
FLEXIBLE LINER ASSEMBLY FOR A FLUID PRESSURE DEVICE
Filed June 27, 1951 4 Sheets-Sheet 3
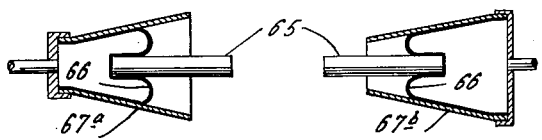
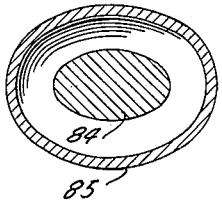
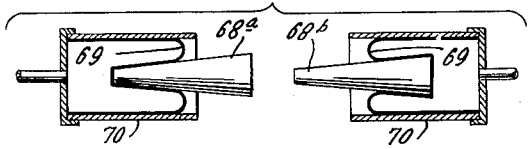
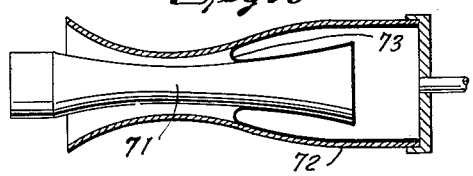
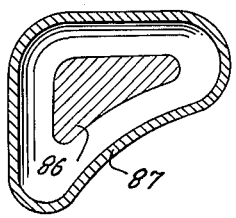
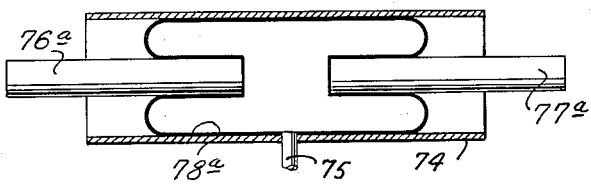
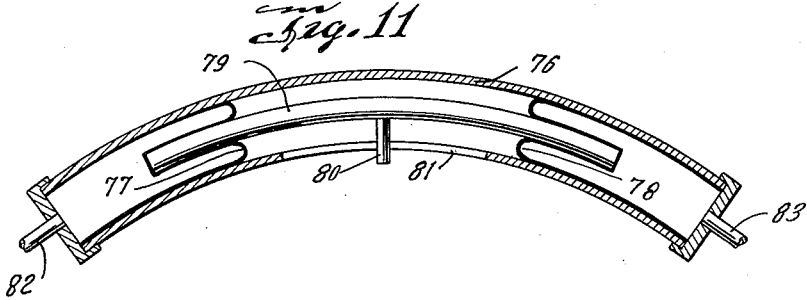
WALTER P. GLANCY
INVENTOR.
ATTORNEY

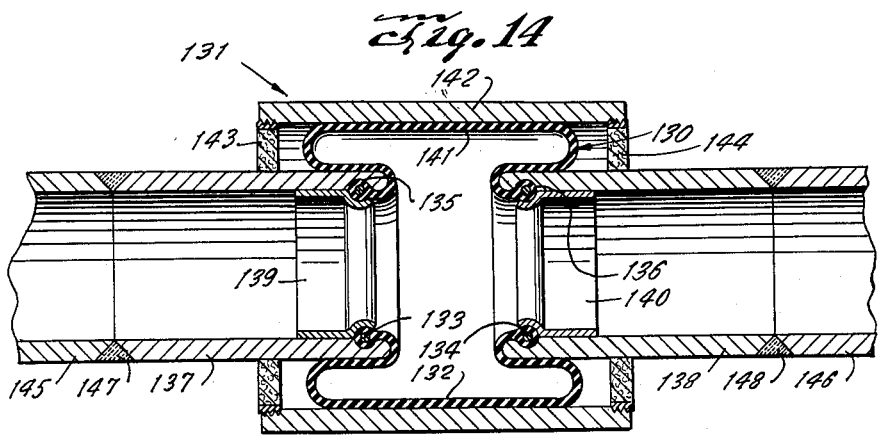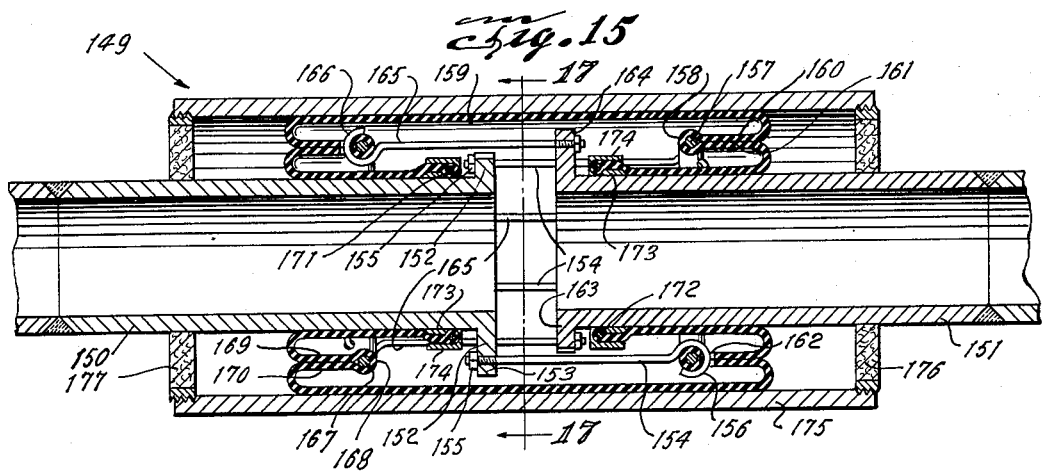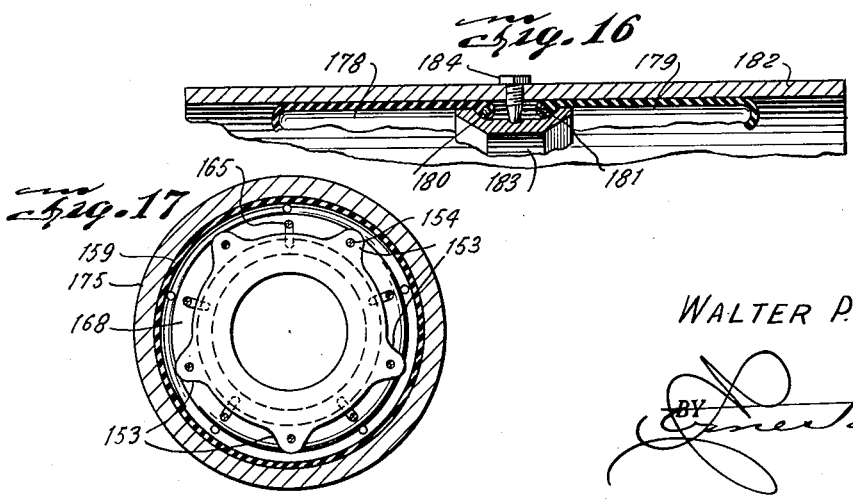

United States Patent Office 2,725,078
Patented Nov. 29, 1955

2,725,078

FLEXIBLE LINER ASSEMBLY FOR A FLUID PRESSURE DEVICE

Walter P. Glancy, Dallas, Tex.

Application June 27, 1951, Serial No. 233,857

3 Claims. (Cl. 137—791)

This invention relates to fluid pressure devices and hydraulic systems and more particularly to a flexible liner or sac structure for use therein.

Fluid pressure devices and hydraulic systems often employ cylinders in which plungers are mounted for reciprocatory movement under the forces exerted by fluids under pressure admitted into the cylinders. Fluid tight seals must be established between the plunger and the cylinder to prevent leakage of fluid therebetween. Conventional seals, such as rings or packing which abut the plungers and the cylinders due to the movement of the plungers relative to the cylinders and the seals, require frequent maintenance servicing and wear rapidly. In addition, the whole hydraulic system employing such cylinder and plunger assemblies is continuous so that a leakage in any part of the system will affect the whole system. If air is introduced into any part of such hydraulic systems, the whole system must be bled of air before the system can be returned to normal operative condition. It is desirable, therefore, to interpose a flexible fluid elastic liner or membrane assembly between the plunger and the hydraulic fluid of the device or system in order to avoid the necessity of making fluid tight seals between two relatively movable members. The elastic liner assembly will also serve to isolate one portion of the hydraulic system from other portions so that a leak in one portion of the system will not affect other portions. Such elastic liner assemblies must be capable of great displacements in order to allow for a large range of movement or stroke of the plungers and at the same time must be capable of withstanding great pressures.

Accordingly, it is an object of this invention to provide a new and improved flexible liner assembly for use in fluid pressure devices and systems.

It is another object of this invention to provide a new and improved flexible liner assembly capable of great displacement and capable of withstanding great pressures.

It is another object of the invention to provide a flexible liner assembly attachable to a cylinder and a plunger for causing relative movement between the plunger and the cylinder upon admission of fluid under pressure into the cylinder on one side of the liner assembly.

It is still another object of this invention to provide a flexible liner assembly for joining two relatively movable structures which will form a fluid tight connection therebetween.

Briefly stated, in one embodiment of the invention the flexible liner assembly comprises a flexible fluid tight sac having an open end which is secured to one end of a cylinder and a fluid end to which is secured a plunger. A flexible reinforcing sac is provided for the fluid tight sac to allow the flexible liner assembly to withstand large pressures exerted by hydraulic fluid admitted through the open end of the sac to move the plunger relative to the cylinder. The flexible liner assembly is adapted to extend about the plunger and between the plunger and the cylinder, the fluid pressure within the assembly tending to maintain the plunger concentrically aligned with respect to the cylinder. In other embodiments of the invention the flexible liner assembly is employed in an expansible joint between two pipes which conduct fluids under pressure.

For a better understanding of the invention, reference may be had to the following description taken in connection with the accompanying drawing and its scope will be pointed out in the appended claims.

In the drawing,

Figure 1 is a diagrammatic illustration of a hydraulic system employing the flexible liner assembly of the invention, with some parts shown in section;

Figure 2 is a longitudinal sectional view of a device employing a flexible liner asnembly;

Figure 3 is a fragmentary sectional view showing a modified form of the device shown in Figure 2;

Figures 7, 8, 9, 10 and 11 are diagrammatic sectional illustrations of various forms of cylinders and plungers with which the flexible liner assembly of the invention may be employed;

Figures 12 and 13 are transverse sectional views of irregularly shaped plungers and cylinders with which the flexible liner assembly may be employed;

Figure 14 is a longitudinal sectional view of an expansion joint provided with a flexible liner assembly;

Figure 15 is a longitudinal sectional view of a modified form of the expansion joint shown in Figure 14;

Figure 16 is a fragmentary sectional view of still another modified form of the expansion joint shown in Figure 14; and Figure 17 is a sectional view taken on the line 17—17 of Figure 15.

Figure 5:
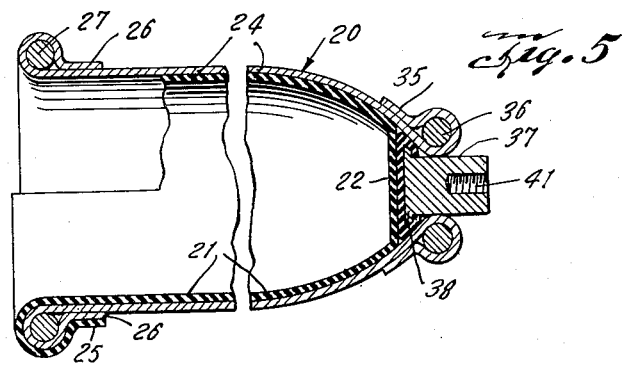
Figure 5 is a longitudinal sectional view of the form of flexible liner assembly shown in Figure 2.
Figure 6:
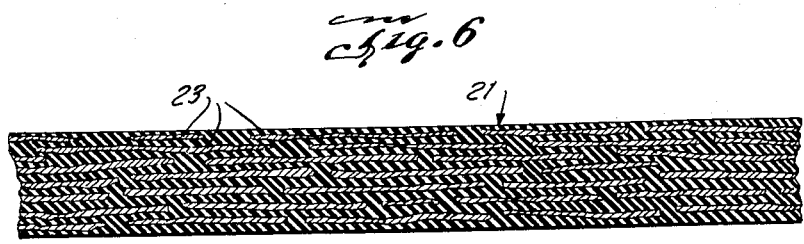
Figure 6 is a longitudinal sectional view of a portion of the fluid tight flexible inner sac or member of the liner assembly showing the reinforcing fibers embedded in the resilient substance of the sac.

Referring now especially to Figures 2 and 5 of the drawing, a flexible liner assembly 20 is illustrated which comprises an inner fluid tight flexible member or sac or sleeve 21 having a blind end 22. The sac 21 is preferably formed of rubber or other elastic impermeable substance which may have longitudinally extending fibers 23 embedded therein. The fibers 23 reinforce the rubber sac and limit the longitudinal elasticity thereof. An outer reinforcing sleeve 24 of flexible material fits about the fluid tight sac 21. The sleeve 24 may be made of cotton, wool, plastic, metal or other type cloth which has the ability to stretch circumferentially but not axially. The ends 25 and 26 of the sac 21 and the sleeve 24, respectively, are turned back on themselves over a retainer ring 27. The retainer ring 27 and the portions of the sac 21 and sleeve 22 turned over it are disposed between the end 28 of a cylinder 29 and the inner wall 30 of a cylinder head 31 threaded on the cylinder. The wall 30 may be provided with an annular groove 32 in which the ring 27 is received. The joint between the cylinder head 31 and the cylinder 29 is made fluid tight by screwing the cylinder head on the cylinder to compress the turned over portions of the sac 21 and the sleeve 24 therebetween. The cylinder head has a central threaded aperture 33 which receives a threaded coupling 34 through which hydraulic fluid may be admitted to the cylinder and the inner sac 21. The opposite end 35 of the sleeve 24 is of smaller diameter than the end 26 and is turned back on itself over a retainer ring 36.

A centering plug 37 having an enlarged end 38 extends through the end 35 of the retainer ring 36. The enlarged end 38 is disposed between and abuts the end 22 of the inner fluid tight sac 21 and the end 35 of the outer sleeve 24. The centering plug 37 extends into a bore in the end 39 of a plunger 40 and may be secured rigidly thereto in any suitable manner. For example by a bolt (not shown) engaging in the threaded bore 41 of the centering plug. It will be apparent that the retainer ring 36 is disposed between the enlarged end 38 of the centering plug and the end 39 of the plunger 40 so that the plunger 40 is attached to the flexible liner assembly 20. A cover 42 of rubber or other soft material is provided for the enlarged end 38 of the centering plug to prevent damage to the fluid tight sac 21 due to contact with sharp or hard edges or surfaces.

It will be apparent now that when fluid under pressure is admitted through the coupling 34 into the inner sac 21, the flexible liner assembly 20 will be moved into the position shown in Figure 2 in which the end 39 of the plunger is adjacent the cylinder head 31. Intermediate portions of the sac 21 and the sleeve 24 will then be supported circumferentially by the inner wall of the cylinder 29 and the outer surface of the plunger 40. Since the outer sleeve 24 cannot stretch axially but only circumferentially, the outer curved portion 43 limits the expansion of the elastic fluid tight inner sac 21. The fluid pressure will be equal on all sides of the plunger 40 when it is concentric with the cylinder 29 and therefore, the fluid will tend to keep the plunger centered in the cylinder. The outer sleeve 24 also acts as a reinforcing means for the inner sac 21 so that very high fluid pressures may be used without rupturing the elastic fluid tight sac 21. If the pressure within the inner sac 21 is increased, the plunger 40 will be moved outwardly, in the direction indicated in the arrow in Figure 2, against any force applied to the plunger 40. If desired, a spring (not shown) may be secured to the plunger 40 in any conventional manner to bias it toward the cylinder head 30. The cylinder head 31 is provided with lugs 44 and 45 by means of which it may be mounted on any suitable base structure.

A dirt shield 46 of flexible material may have one end secured to the outer end 47 of the plunger 40 by a ring 48 and the other end secured to the end 49 of the cylinder 29 by a ring 50 having an inner flange 51 which telescopes into the cylinder. The dirt shield is fluid tight to maintain a partial vacuum in space 50a (Fig. 2) and its function is to prevent entrance of dirt into the cylinder. If desired, a disk 52, Figure 3, may be threaded into the end 49 of the cylinder to close it and prevent passage of dirt into the cylinder. The disk 52 is provided with a suitable central aperture through which the plunger 40 extends.

Figure 4:
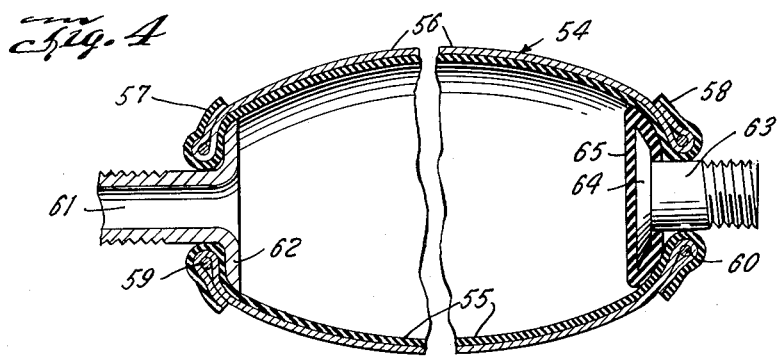
Figure 4 is a longitudinal sectional view of one embodiment of the flexible liner assembly.

In Figure 4 is illustrated a modification of the flexible liner assembly shown in Figures 2 and 5. The flexible liner assembly 54 includes a flexible elastic fluid tight sleeve 55 which is disposed within a flexible sleeve 56 formed, like the sleeve 24, of material which has the ability to stretch circumferentially but not axially. The opposite ends 57 and 58 of the sleeves are turned back on the sleeves over retainer rings 59 and 60, respectively. A coupling or port 61 provided with an outwardly extending flange 62 disposed in the sleeve 55 extends outwardly and is adapted to engage in the threaded aperture 33 of the cylinder head 31 of Fig. 2, the ends 57 of the sleeves then being compressed between the wall 30 of the cylinder head and the flange 62 to form a fluid tight seal therebetween.

The centering plug 63 is provided with an enlarged end 64 having a soft protective cover 65. The plug 63 is threaded to engage in a threaded bore in an end 39 of the plunger 40 of Fig. 2 so that the retainer ring 60, the ends 58 of the sleeves, and portions of the cover 65 will be compressed between the enlarged end 64 of the centering plug 63 and the end 39 of the plunger 40 to form a liquid tight seal therebetween. If desired, a suitable cement may be employed to secure the various components together. The flexible liner assembly 54 functions in the same manner as the assembly 20 of Figure 2 when in position in the cylinder 29.

Figures 7 to 11 illustrate diagrammatically several different forms which the plungers and cylinders may take. In each case the fluid pressure on all sides of the plunger will be equal so that the plunger will be held concentric to the cylinder.

In Figure 7, the rod shaped plunger 65 may be secured to a flexible liner assembly 66 secured to a cylinder 67a or 67b having a truncated conical shape with the plunger extending through the larger or smaller end, as may be desired.

In Figure 8, the plungers 68a and 68b may be secured to a flexible liner assembly 69 secured to a cylinder 70. The plungers 68a and 68b are of truncated conical shape and either the small or the large end of the plunger, as shown, may be secured to the flexible liner assembly 69.

In Figure 9 is illustrated a plunger 71 and a cylinder 72 of axially varying diameters which are connected by the flexible liner 73.

Figure 10 illustrates a cylinder 74 having a single port 75 and open ends through which extends two plungers 76a and 77a which are simultaneously actuated by the flexible liner assembly 78a when fluid under pressure is admitted into the cylinder 74 through the port 75.

In Figure 11 is illustrated a curved cylinder 76 provided at its opposite ends with flexible liner assemblies 77 and 78. A single curved plunger 79 extends between the two assemblies and is provided with a rod 80 which extends out of the cylinder through an elongated slot 81 provided in one side thereof. It will be apparent that the plunger 79 may be moved to the right or left to force fluid from one assembly through its port 82 or 83 while allowing fluid to enter into the other port 83 or 82 as the case may be.

Figures 12 and 13 illustrate the varied cross-sectional shapes that the cylinders and plungers may take. In Figure 12 the plunger 84 and the cylinder 85 are oral or ellipsoidal in cross-sectional configuration. In Figure 13, the plunger 86 and the cylinder 87 are substantially triangular in cross-sectional configuration.

It will be apparent that due to the circumferential elasticity of the flexible liner assembly of the invention, it may be employed in hydraulic systems and fluid pressure devices with plungers and cylinders of various configurations.

In Figure 1 is illustrated diagrammatically a hydraulic system in which movement of the plunger 88 of the cylinder 89 results in corresponding movement of the cylinder 90. The cylinder 89 is provided at its opposite ends with flexible liner assemblies 91 and 92 to which opposite ends of the plunger 88 are connected. A conduit 93 connects the cylinder head 94 to a rigging assembly 95. The rigging assembly 95 comprises a coupling 96 having a T-shaped bore 97 which communicates with the flexible liner assembly 98 of a cylinder 99. The plunger 100 connected to the liner assembly 98 has a threaded portion which engages in a threaded aperture in the cylinder cap 101. The conduit 102 connects the coupling 96 to a bore 103 in a stationary plunger 104. The end 105 of the plunger is flared outwardly to provide a flange similar to the flange 62, Figure 4, so that fluid may enter into the flexible liner assembly 106 provided in the end of the cylinder 90 closed by head 107.

A conduit 108 similarly connects the cylinder head 109 to a rigging assembly 110. The rigging assembly 110 is identical with the rigging assembly 95 and elements of the assembly 110 have been provided with the reference characters applied to the corresponding elements of the assembly 95. The conduit 111 connects the rigging assembly to an isolating or disconnecting cylinder assembly 112 which is provided with flexible liner assemblies 113 and 114 connected to opposite ends of the cylinder 115.

A plunger 116 connects the two flexible liner assemblies so that when fluid enters into one end of the cylinder 115 through the conduit 111, the plunger 116 will move to the right and cause fluid to be expelled from the other end of the cylinder into the conduit 117. The cylinder 115 may be made in two sections detachably connected by a lock ring 117b in any conventional manner. The conduit 117 is connected to the bore 118 of the stationary plunger 104. The end 119 of the plunger is flared outwardly and is connected to the flexible liner assembly 120 provided in the end of the movable cylinder 90 closed by the head 121. The movable cylinder 90 is provided with elongated slots 122 and 123 through which the conduits 102 and 117 may extend to the stationary plunger 104.

In use, when the plunger 88 is moved in one direction, say to the left, by means of its outwardly extending handle 124 protruding through the elongated slot 125 in the stationary cylinder 89, fluid will pass through the conduit 93, the bore 97 of the coupling 96 of the rigging assembly 95, the conduit 102 and the bore 103 of the stationary plunger 104 to the flexible liner assembly 106. Since the plunger 104 is stationary, the increased pressure will move the movable cylinder 90 to the left. This will expel fluid from the flexible liner assembly 120 into the bore 118 of the stationary member 104 which in turn will cause fluid to flow through the conduit 117 into the flexible liner assembly 114 of the disconnecting assembly 112. The plunger 116 will move to the left expelling fluid from the flexible liner assembly 113 into the conduit 111 resulting in the movement of fluid into the flexible liner assembly 92 from the conduit 108. If the movable plunger 88 is now moved to the right, the reverse sequence of operation will take place. In this manner, the movable cylinder 90 may be caused to move to positions relative to the stationary plunger 104 corresponding to the positions of the movable plunger 88 relative to the stationary cylinder 89. It will be obvious that the cylinder 90 could be held stationary and the plunger 104 made movable. In this case, the plunger 104 could be solid and the conduits 102 and 117 could be connected to suitable apertures in the heads 107 and 109, respectively.

The plunger 88 can be adjusted to any desired initial position by turning the screws 126 and 127 of the rigging assemblies 95 and 110 to force more or less fluid from the flexible liner assemblies 98 into opposite sides of the hydraulic system.

The isolating or disconnecting assembly 112 is employed to isolate one portion of the system from others so that damage to one portion will not cause leakage of fluid from the whole system. For example, if the flexible liner assembly 120 sprung a leak, the trouble could be easily repaired by removing the head 121 and replacing this assembly. Only the fluid in the flexible liner assemblies 114 and 120 and in the connecting conduit 117 would be lost. If slight leakage occurred and some air entered into the conduit 117 or the assemblies 114 and 120, only this portion of the hydraulic system would have to be bled of air. In this manner the assembly 112 serves to isolate one portion of the system from another. As many disconnecting assemblies may be used as desired. For example, one could be inserted in the system between the conduit 102 and the bore 103.

Referring now to Figure 14, the flexible liner assembly 130 is shown employed in an expansion joint 131. The flexible liner assembly may consist of a single fluid tight sleeve 132 having longitudinally extending fibers embedded therein or may be of the general type illustrated in Figure 4 in which an inner fluid tight sleeve and an outer reinforcing sleeve are employed. The retainer rings 133 and 134 on opposite ends of the flexible liner assembly are received in inner annular grooves 136 and 135 provided in the hollow plungers 137 and 138, respectively. Lock rings 139 and 140 telescoped in the plungers 137 and 138 are employed to fasten the ends of the flexible fluid tight sleeve to the plungers. If desired, cement or other adhesive may be employed to fasten the lock ring, the ends of the sleeve and the plungers to one another. The intermediate circumferentially expanded portion 141 of the sleeve is supported by the inner surface of the cylinder 142 which is disposed about the adjacent ends of the plungers. The cylinder may be internally threaded at its ends to receive disk 143 and 144, threaded at their peripheral edges, which are provided with central apertures through which the plungers 137 and 138, respectively, extend. The disks serve as dirt shields. Narrow abutting portions of the sleeve 132 and the cylinder 142 may be cemented together to keep the cylinder at a desired position with respect to the sleeve.

In use, the plungers 137 and 138 are welded to adjacent pipes 145 and 146 as at 147 and 148, respectively, so that the expansion joint 131 becomes a part of the pipe line. If the pipes 145 and 146 expand or contract longitudinally and move relative to each other, the sleeve 132 will permit this movement and still maintain a fluid tight seal between the pipes.

In Figures 15 and 17 is shown a modified form of the expansion joint illustrated in Figure 14. The expansion joint 149 is provided with tie rods which resist the tendency of the plungers 150 and 151 to be forced apart by the fluid pressure in the pipe line system. The plunger 150 is provided with an outwardly extending flange 152 having a plurality of radially spaced lugs or projections 153. The lugs 153 are provided with apertures through which extend the threaded ends of the tie rods 154 which are secured to the lugs by nuts 155 or in any other conventional manner. The opposite ends 156 of the tie rods 154 are bent back on themselves and extend about a retainer ring 157 which is disposed in an end fold 158 of the flexible fluid tight sleeve 159. The abutting sides 160 and 161 of the sleeve may be cemented adjacent the ring 157 to prevent fluid from leaking out through the holes 162 formed in the sleeve to receive the ends 156 of the tie rods 154.

The plunger 151 is provided with a similar flange 163 having projections 164. Tie rods 165 are secured to the projections 164 and have ends 166 which extend about a retainer ring 167 disposed in the opposite end fold 168 of the sleeve 159. Adjacent abutting portions 169 and 170 of the sleeve may be cemented together. Opposite extreme ends of the sleeve 159 are provided with retainer rings 171 and 172 which are firmly secured to the plungers 150 and 151, respectively, by means of pairs of cooperating lock rings 173 and 174. The fixed rings 173 are rigidly secured to the plungers by welding while the lock rings 174 telescope over the fixed rings in the manner shown. It will be seen now that the tie rods 154 and 165 being connected to the portions of the flexible sleeve which are biased outwardly in opposite directions by the fluid pressure in the pipe line system will resist or counteract the tendency of the plungers 150 and 151 to move apart due to the forces exerted by the fluid pressure. A cylinder 175, similar to cylinder 142, having dirt shields 176 and 177 is also provided as in the form of the expansion joint shown in Figure 14.

In Figure 16 is shown a modified form of the expansion joint illustrated in Figures 14 and 16. In this form of the expansion joint two flexible fluid tight sleeves 178 and 179 are employed whose adjacent ends are provided with retainer rings 180 and 181, respectively, and are held in desired position within a cylinder 182 by means of a lock ring 183 and a key screw 184. It will be noted that the rings 180 and 182 are pulled in such directions that a fluid tight seal is obtained. Of course, cement or other sealing compound may be employed wherever necessary in any of the devices illustrated to seal any opening against fluid leakage.

It will be seen now that a flexible liner assembly has been illustrated and described which may be used in various installations wherever two relatively movable elements are subjected to fluid pressures and which form fluid tight seals between such relatively movable elements without employing rings or packing which is subject to frictional wear. In addition, a simple easily installed flexible liner assembly has been shown which can be employed with hydraulic systems to isolate certain portions thereof from other portions and which tends to maintain the plungers of the systems concentrically aligned in their associated cylinders.

It will be apparent to those skilled in the art that various changes and modifications can be made in the illustrated embodiments of the invention without departing from the invention and it is intended, therefore, in the appended claims to cover all such changes and modifications as fall within the true spirit and scope of the invention.

What is claimed is:

1. A flexible liner assembly for a fluid pressure device comprising, an elongated fluid tight inner elastic sleeve; a flexible circumferentially elastic reinforcing outer sleeve disposed about said inner elastic sleeve; said outer sleeve having both ends open, said inner elastic sleeve having one end closed and an open end in juxtaposition with an open end of said outer sleeve, said juxtapositioned ends being folded onto said sleeves and the opposite open end of said outer sleeve being folded onto said outer sleeve, a retaining ring embraced by the folded juxtapositioned ends of said sleeves, a second retaining ring embraced by the folded opposite end of said outer sleeve, said rings being effective to fasten said sleeves in fluid tight relation to two relatively movable members of the fluid pressure device.

2. A flexible liner assembly for a fluid pressure device comprising, an elongated fluid tight inner elastic sleeve; a flexible circumferentially elastic reinforcing outer sleeve disposed about said elastic sleeve, said inner elastic sleeve having an open end and a closed end, said outer sleeve having both ends open; a first retaining ring disposed about said sleeves adjacent the open ends of said elastic sleeves, said open end of said inner elastic sleeve and the adjacent open end of the outer sleeve extending back over said sleeves and over said retaining ring; a second retaining ring, the other open end of said outer sleeve extending back over said outer sleeve and over said retaining ring; and means disposed between said closed end of said inner elastic sleeve and said second retaining ring for attaching one end of said flexible liner assembly to an element of said fluid pressure device.

3. A hydraulic device comprising a cylinder; a cylinder head secured to one end of said cylinder and having an aperture for admitting fluid under pressure into said cylinder, an elongate fluid tight inner elastic sleeve having an open and a closed end, a flexible circumferentially elastic reinforcing and open ended outer sleeve disposed about said inner elastic sleeve, said open end of said inner sleeve and the open end of the outer sleeve being adjacent and extended back over said sleeves, a retaining ring secured between said cylinder and head and enclosed by the backwardly extended ends of said sleeves, a movable plunger extending into said cylinder and having its inner end secured in fluid tight relation to adjacent opposite ends of said sleeves, said adjacent opposite ends of said sleeves and said inner end of said plunger being movable toward said cylinder head whereby portions of said outer sleeve are circumferentially supported by said cylinder and said plunger, said plunger being maintained in concentric relation to said cylinder by fluid admitted through said aperture into said sleeve.

References Cited in the file of this patent

UNITED STATES PATENTS

| 242,297 | Garsed | May 31, 1881 |
| 971,583 | Bell | Oct. 4, 1910 |
| 1,077,472 | Hofmann | Nov. 4, 1913 |
| 1,855,696 | Stover | Apr. 26, 1932 |
| 2,088,042 | Stephens | July 27, 1937 |
| 2,172,694 | Blondelle | Sept. 12, 1939 |
| 2,178,953 | Chilton | Nov. 7, 1939 |

FOREIGN PATENTS

| 704,479 | France | Feb. 23, 1931 |